United States Patent [19]

Saban

[11] Patent Number: 5,500,525
[45] Date of Patent: Mar. 19, 1996

[54] AREA SURVEYING APPARATUS AND COMMUNICATION SYSTEM

[75] Inventor: Izhak Saban, Haifa, Israel

[73] Assignee: State of Israel, Ministry of Defence, Rafael-Armaments Development Authority, Haifa, Israel

[21] Appl. No.: 282,713

[22] Filed: Jul. 29, 1994

[30] Foreign Application Priority Data

Aug. 1, 1993 [IL] Israel ..................................... 106544

[51] Int. Cl.$^6$ ............................... G01V 9/04; H04B 9/00
[52] U.S. Cl. ................ 250/221; 250/206.1; 340/825.54; 342/45
[58] Field of Search .............................. 250/206.1, 206.2, 250/221, 222.1; 340/555–557, 825.54; 342/45; 359/154, 155, 157, 168, 180, 189

[56] References Cited

U.S. PATENT DOCUMENTS

| | | | |
|---|---|---|---|
| 3,504,979 | 4/1970 | Stephany . | |
| 3,623,057 | 11/1971 | Hedin et al. . | |
| 3,956,747 | 5/1976 | Leypold | 342/45 |
| 4,017,716 | 4/1977 | Teiling . | |
| 4,249,265 | 2/1981 | Coester | 342/45 |
| 4,820,050 | 4/1989 | Griffin | 250/221 |
| 4,893,005 | 1/1990 | Stiebel | 250/222.1 |
| 5,055,666 | 10/1991 | Miyahara . | |
| 5,063,288 | 11/1991 | Hsu et al. . | |
| 5,089,822 | 2/1992 | Abaunza et al. . | |
| 5,142,288 | 8/1992 | Cleveland | 342/45 |
| 5,202,783 | 4/1993 | Holland et al. | 342/45 |
| 5,231,400 | 7/1993 | Mouldin et al. | 342/45 |
| 5,375,008 | 12/1994 | Guerreri | 342/45 |

FOREIGN PATENT DOCUMENTS

| | | |
|---|---|---|
| 0127088 | 12/1984 | European Pat. Off. . |
| 0532976 | 3/1993 | European Pat. Off. . |
| 3415233 | 11/1985 | Germany . |

*Primary Examiner*—Stephone B. Allen
*Attorney, Agent, or Firm*—Michael N. Meller

[57] ABSTRACT

A method of protecting a predetermined area, comprises the steps of: a) providing a base station positioned essentially at the center of the area to be protected, the said base station being provided with scanning laser beam generating and receiving means, image and signal processing units, memory means, voice receiving and transmitting means and image viewing means; b) causing a laser beam generated by the base station to be reflected from the surveyed area into the receiving means of the base station; c) processing the received reflected light to generate an image of the surveyed area; d) storing one or more scanned images in memory means, to be used as reference images; e) at any given time, comparing a real-time scanned image with one or more stored reference image(s), to determine changes which have occurred on the image, which exceed predetermined threshold values, and alerting the operator of the base station of any such changes; f) providing one or more moving station(s) comprising emitting/receiving laser generating means and signal processing means, and causing the said moving station to generate an emitted signal which identifies it; and g) providing recognition means within the signal processing means of the base station, to recognize the signal generated by the moving station as a friendly signal, and to alert the operator of the base station whether a change in the image of the scanned area belongs to a friendly or to an unfriendly force.

14 Claims, 5 Drawing Sheets

AREA SURVEYING APPARATUS AND COMMUNICATION SYSTEM

FIELD OF THE INVENTION

The present invention relates to an apparatus for surveying a predetermined area and, at the same time, for communicating with friendly forces found within the surveyed area. More particularly, the invention relates to the use of laser emission for achieving the said purposes.

BACKGROUND OF THE INVENTION

It is a well known problem, when surveying a given area, to be able to distinguish between friendly and unfriendly forces moving through it. Normally, the area surveyed is scanned either visually or by movement detecting means, e.g., apparatus which detects heat, and the surveying person is thus alerted of that movement takes place within the surveyed area. When friendly forces move through the surveyed area, the surveying person normally identifies them by maintaining radio contact, or by visual signs, when possible. However, identifying moving persons by radio transmission presents severe drawbacks; the radio transmission can be easily picked up by unfriendly forces moving through the area, heavy radio equipment must be carried if voice communication is desired, and if a simple emitted identification signal is used, it can be relatively easily forged.

THE PRIOR ART

The prior art has made use of laser emission in a limited way. For instance, U.S. Pat. No. 5,063,288 deals with an apparatus for securing a confined space with a laser emission, by generating laser vertical securing planes from a laser beam and reflecting them into a formation confining a plane. Shielding or interruption of a laser vertical securing plane by an intruder generates an alarm signal.

U.S. Pat. No. 3,623,057 discloses a laser perimeter intrusion detection system, in which laser beams are generated which define the perimeter of the area to be protected. When a beam is interrupted by an intruder an alarm is generated.

Other systems employ directional apparatus, such as pointers, to determine the location of a target, such as in U.S. Pat. No. 4,017,716 or U.S. Pat. No. 5,055,666.

SUMMARY OF THE INVENTION

The prior art systems have so far failed to provide simple and effective systems in which an area can be surveyed using laser beams. Furthermore, the art has so far not provided an effective friend-or-foe (FOF) determination system, to discriminate between authorized and non-authorized movement in a given area.

It is an object of the invention to provide a system and a method which overcome the drawbacks of prior art systems.

It is another object of the invention to provide a surveying system which can be effectively used to survey a given area and to alert the surveying person of movements which take place within the said area.

It is still another object of the invention to provide a method and means by which the surveying person can identify friendly forces moving within the surveyed area, and communicate with them through directional communication beams.

Other objects of the invention will become apparent as the description proceeds.

The method of protecting a predetermined area, according to the invention, comprises the steps of:

a) providing a base station positioned essentially at the center of the area to be protected, the said base station being provided with scanning laser beam generating and receiving means, image and signal processing units, memory means, voice receiving and transmitting means and image viewing means;

b) causing a laser beam generated by the base station to be reflected from the surveyed area into the receiving means of the base station;

c) processing the received reflected light to generate an image of the surveyed area;

d) storing one or more scanned images in memory means, to be used as reference images;

e) at any given time, comparing a real-time scanned image with one or more stored reference image(s), to determine changes which have occurred on the image, which exceed predetermined threshold values, and alerting the operator of the base station of any such changes;

f) providing one or more moving station(s) comprising emitting/receiving laser generating means and signal processing means, and causing the said moving station to generate an emitted signal which identifies it;

g) providing recognition means within the signal processing means of the base station, to recognize the signal generated by the moving station as a friendly signal, and to alert the operator of the base station whether a change in the image of the scanned area belongs to a friendly or to an unfriendly force.

According to a preferred embodiment of the invention, the method further comprises the steps of:

h) generating a message to be transmitted in digital form and modulating the laser beam generated by the transmitting station, be it the base station or the moving station; and i) receiving in the receiving station the laser beam generated by the transmitting station and decoding the same to produce the transmitted message.

As will be apparent to the skilled person, while it is preferred to operate with communication between the base and the moving station, many advantages are achieved even by operating the invention without such communication, or by just using such communication method to obtain a FOF identification. Accordingly, even such more limited system are intended to be covered by the present invention.

According to a preferred embodiment of the invention, the transmission between the base station and the moving station is effected in blocks, a part of the message being transmitted during a plurality of scanning cycles of the base station.

According to another preferred embodiment of the invention, the scanning movement of the laser beam of the base station is stopped once line of sight contact is achieved, and the message is transmitted in its entirety before scanning is resumed.

As more fully explained below, in some cases it is desirable or necessary that the message be transmitted via one or more intermediate mediating station(s).

The invention also encompasses a system for protecting a predetermined area, which system comprises: a) a base station positioned essentially at the center of the area to be protected, the said base station being provided with scanning laser beam generating and receiving means, image and signal processing units, memory means, voice receiving and transmitting means and image viewing means;

b) receiving means positioned within the base station, for receiving light from a laser beam generated by the base station and reflected from the surveyed area;
  c) processing means for processing the received reflected light to generate an image of the surveyed area;
  d) memory means for storing one or more scanned images, to be used as reference images;
  e) comparing means for comparing, at any given time, a real-time scanned image with one or more stored reference image(s), to determine changes which have occurred on the image, which exceed predetermined threshold values, and alarm means for alerting the operator of the base station of any such changes;
  f) one or more moving station(s) comprising emitting/receiving laser generating means and signal processing means, and signal generating means provided within the said moving station, to generate an emitted signal which identifies it;
  g) recognition means provided within the signal processing means of the base station, to recognize the signal generated by the moving station as a friendly signal, and to alert the operator of the base station when a change in the image of the scanned area belongs to a friendly force.

Preferably, as explained above, the system further comprises:

h) message generating means, to generate a message to be transmitted in digital form, and modulating means to modulate the laser beam generated by the transmitting station, be it the base station or the moving station; and
  i) receiving means provided in the receiving station, to receive the laser beam generated by the transmitting station, and decoding means to decode the same to produce the transmitted message.

The above and other characteristics and advantages of the invention will be better understood through the following illustrative and non-limitative description of preferred embodiments.

DETAILED DESCRIPTION OF PREFERRED EMBODIMENTS

Figure 1:
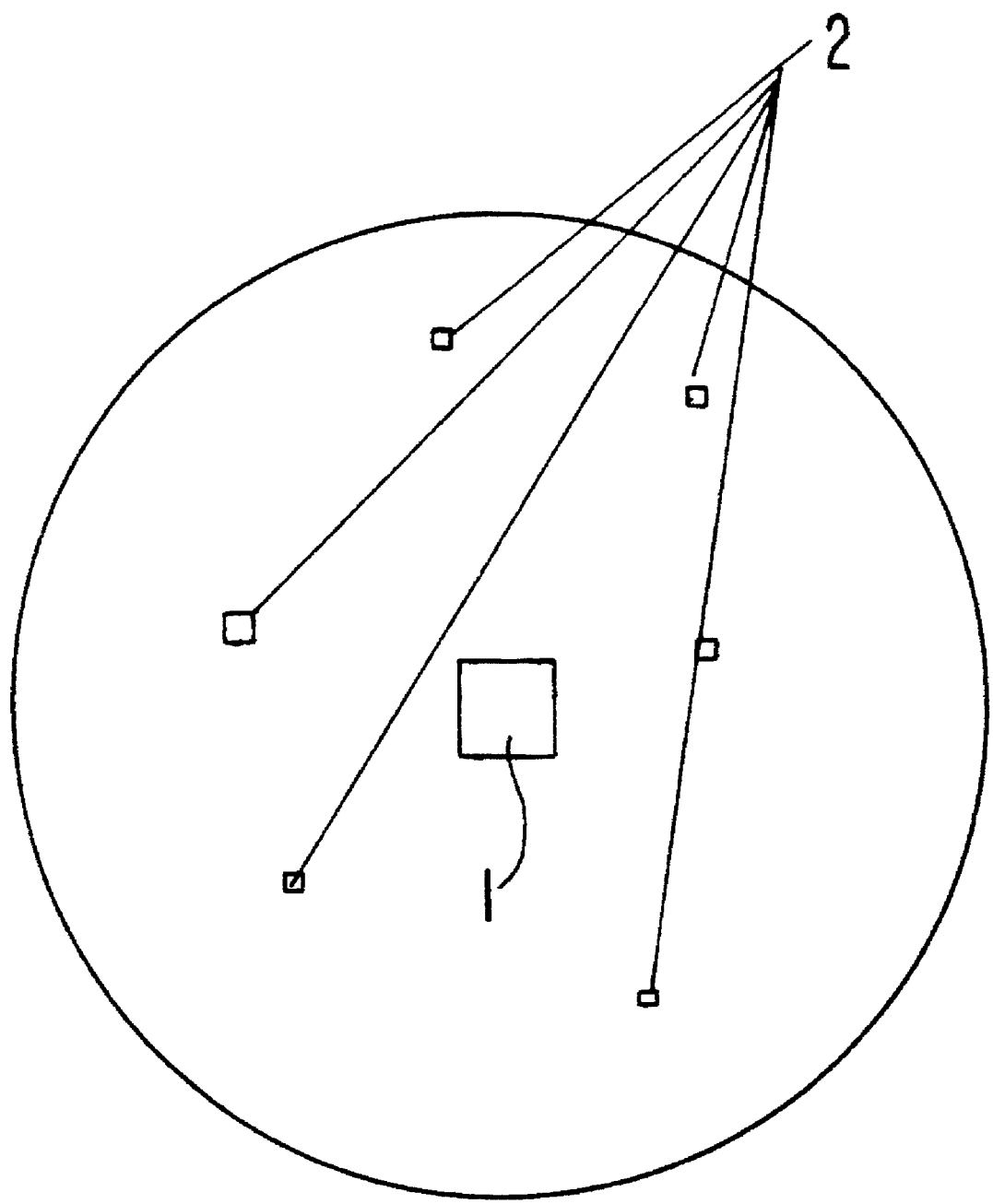
FIG. 1 illustrates a typical situation occurring in a surveyed (or protected) area.

A typical situation is shown in FIG. 1. The circled area represents the surveyed (or protected) area. At the center of the protected area there is positioned a base station according to the invention, indicated by numeral 1. Numeral 2 indicates friendly forces moving through the protected area.

Figure 2:
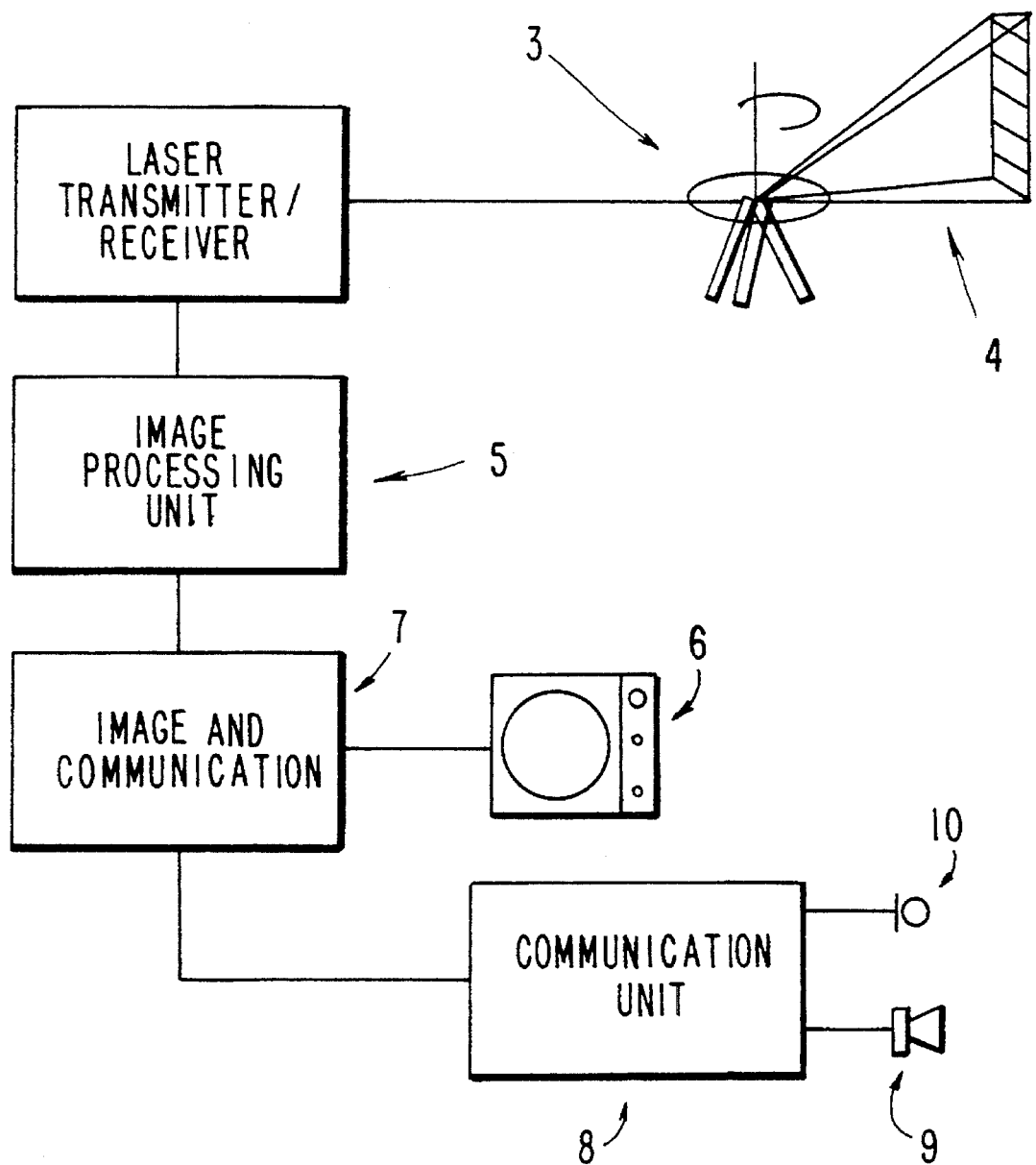
FIG. 2 illustrates a base station according to a preferred embodiment of the invention.

FIG. 2 illustrates a base station (1 of FIG. 1), according to a preferred embodiment of the invention. A laser transmitter/receiver (LTR) 3 generates a laser beam 4 which is reflected by the objects located in the protected area, back to the receiving portion of LTR 3. LTR 3 is mounted on a motor (not shown) which rotates at a constant speed by up to 360°, thereby scanning the whole protected area. The reflection of the laser beam reaching each point in the surveyed area is received by the receiving portion of the LTR 3, and thus generates a three-dimensional image of the surveyed area from the rotation angle, elevation angle and distance from the reflecting point.

The sensor may be of different types. For instance, an array of transmitting diodes can be coupled with an array of receiving diodes. Alternatively, a single transmitter may transmit a propagating beam, the reflection of which is received by an array of diodes, or a single transmitting/receiving diode may be used to scan vertically and horizontally. As will be apparent to the skilled person, the invention is not limited to any particular receiving/transmitting arrangement, and several alternative apparatuses can be used.

The signals generated by the sensors, encoding the three-dimensional picture of the surveyed area are processed in an image and signal processing unit (ISPU), 5. This unit may contain separate units for processing image and transmitted signals, or the same processor can be used for both. This unit also contains memory means to store one or more reference pictures or images, for the purpose of comparison with real-time pictures. When the station begins to operate, the first picture obtained is used as a reference picture. The next picture is then compared in the ISPU with the reference picture, and any differences are signaled to the operator. The image is shown on a screen 6, which receives the picture from an image and communication link (ICL) 7. At the next scanning, the previous picture replaces the first picture as reference, and this process is repeated at each scanning cycle.

The LTR 3 also receives non-reflected laser light, which will be termed hereinafter "communication beam", which originates from the moving station carried by friendly forces moving within the protected area, which will be more fully described hereinafter. This communication beam is modulated so as to carry digital information corresponding to voice or data transmission generated by the moving station, which are decoded in the ISPU 5 and transmitted, via the ICL 7, to a communication unit 8 where the signal is amplified and heard through a loudspeaker 9. The communication unit 8 also comprises a microphone 10. Messages from the base station pass from the microphone 10 of the communication unit 8, through the ICL 7, to the ISPU 5, which modulates the transmitted laser beam 4. The laser beam 4 carrying the modulated information is then received and decoded by the moving station, as will be explained below. Modulation can be carried out in any suitable way, for instance, using the pulse position modulation (PPM) method.

Figure 3:
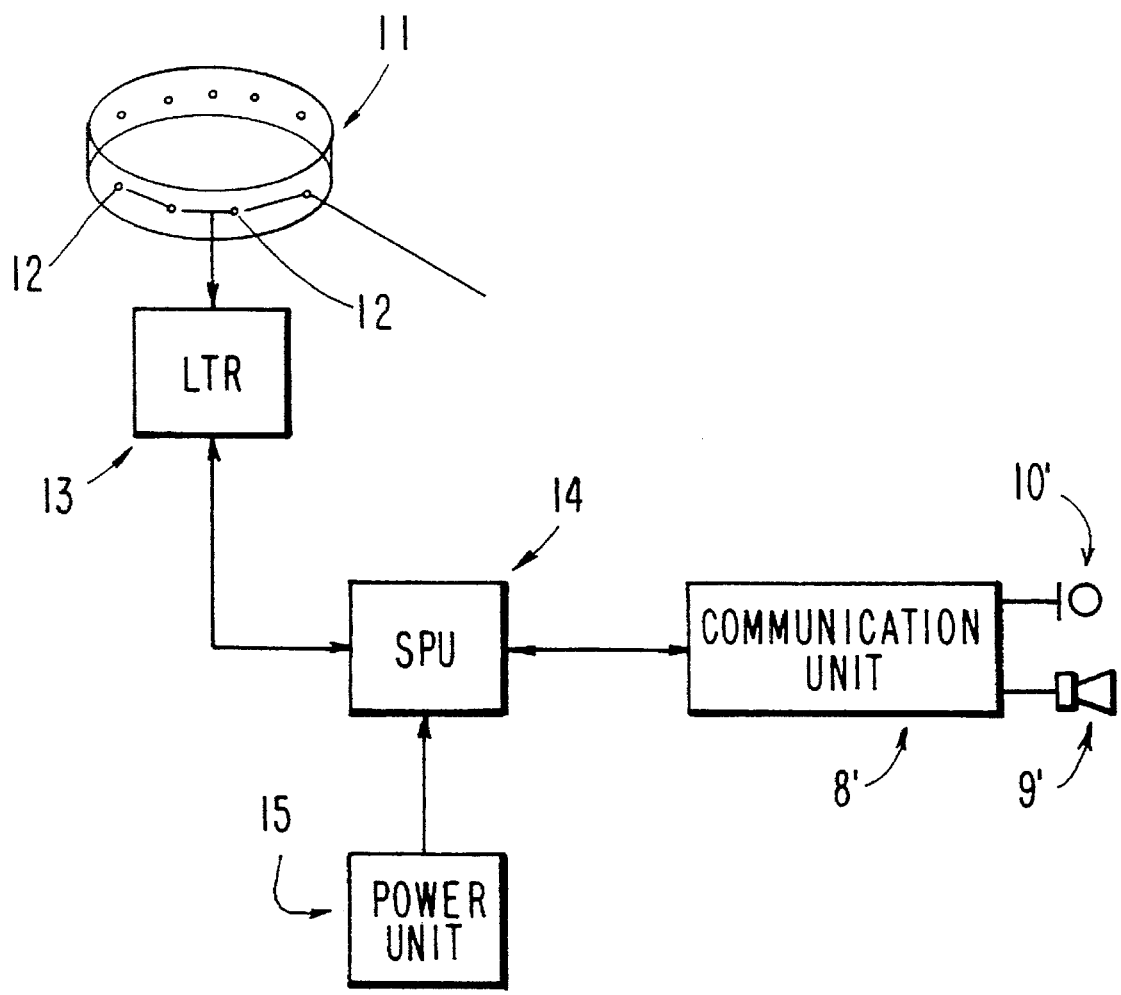
FIG. 3 illustrates the elements of a moving station, according to one preferred embodiment of the invention.

FIG. 3 illustrates the elements of a moving station, according to one preferred embodiment of the invention. A "crown" 11 is worn on the head or helmet, and is provided with a plurality of transmitting/receiving laser diodes 12. The range of such laser diodes is typically about 1 Km. Accordingly, intermediate transmitting stations must be provided, between the moving station and the base station, if the area to be covered has a radius greater than about 1 Km, in order to provide for the receipt of signals exchanged between the base station and the moving station. The crown 11 is coupled with a laser transmitter/receiver (LTR) 13, and with a signal processing unit (SPU) 14 which decodes the modulated laser signals received from the base station, and generates the modulation of the signals transmitted to the base station. A power unit 15 powers the moving station. This unit may comprise one or more batteries, or may comprise a generator. A communication unit 8' is also provided, which is substantially identical to that of the base station (FIG. 2), and which comprises a speaker or headphones 9' and a microphone 10'.

Figure 4:
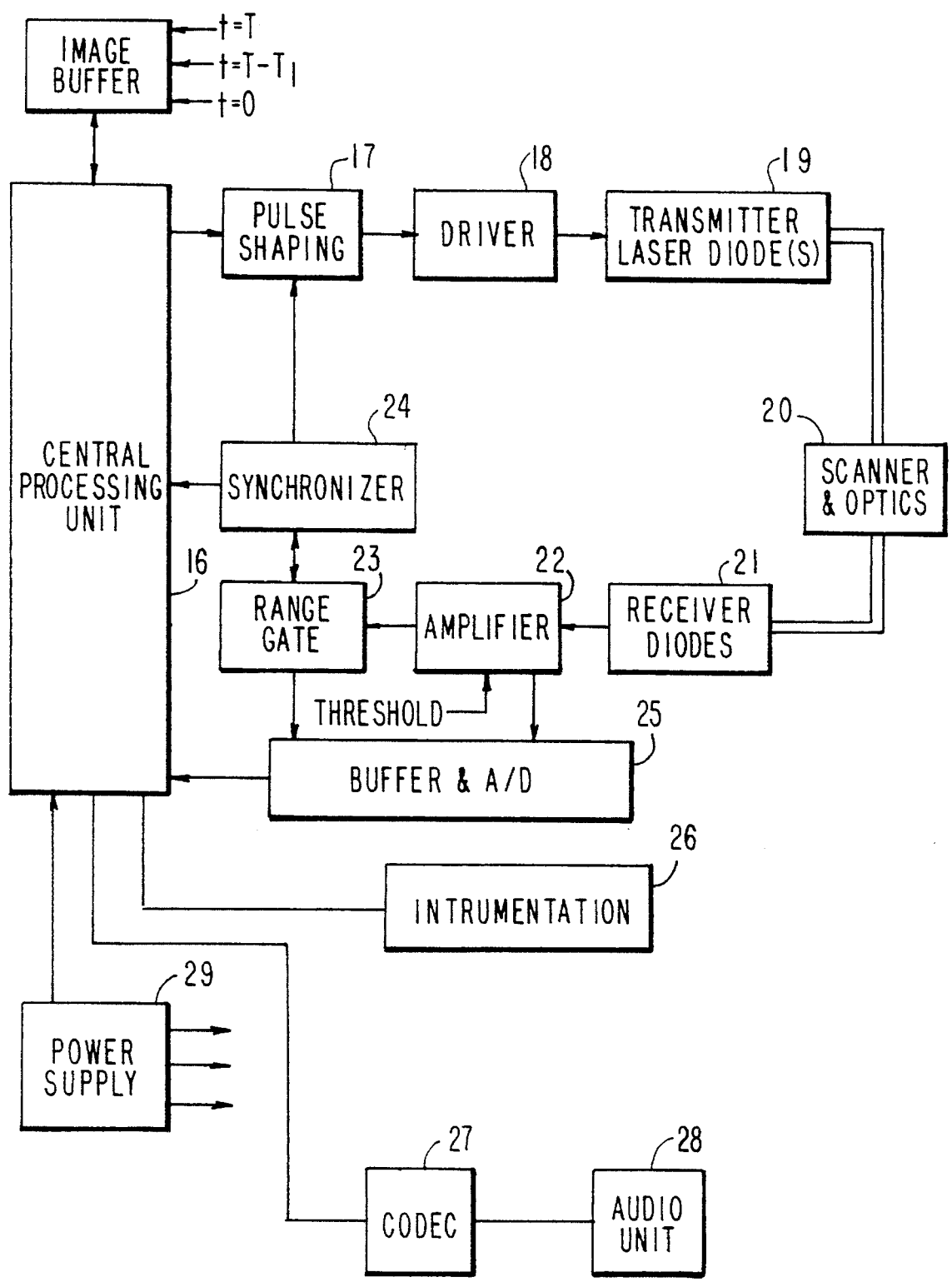
FIG. 4 schematically illustrates a receiving unit according to one embodiment of the invention.

FIG. 4 schematically illustrates a receiving unit according to one embodiment of the invention. The operation of the unit can be understood following the transmission and reception of a single pulse. The central processing unit (CPU) initiates the process by ordering the transmission to take place. The pulse shaping circuit 17 generates an electric signal appropriate for the drive 18, which supplies current to the laser diode 19. The beam so generated is directed in the desired direction by the scanner and optics unit 20. The reflected laser light is received in the receiving diodes 21, which transmit them to a filtering and amplification circuit 22. Signals above a predetermined threshold are passed on to a buffer and A/D unit 25 for sampling. The distance of the reflecting object is determined according to the time-of-flight of the laser pulse. A range gate 23 transmits the measured value of the range to the sampling unit 25 of the computer. The computer samples the signals in addition to the sampling of the transmission direction effected through scanning means 26. The voice signals are transmitted from the audio unit 28 and are coded in the transmission process, and decoded in the reception process, in the coding/decoding (CODEC) unit 27. The system is operated by power supply means 29.

Figure 5:
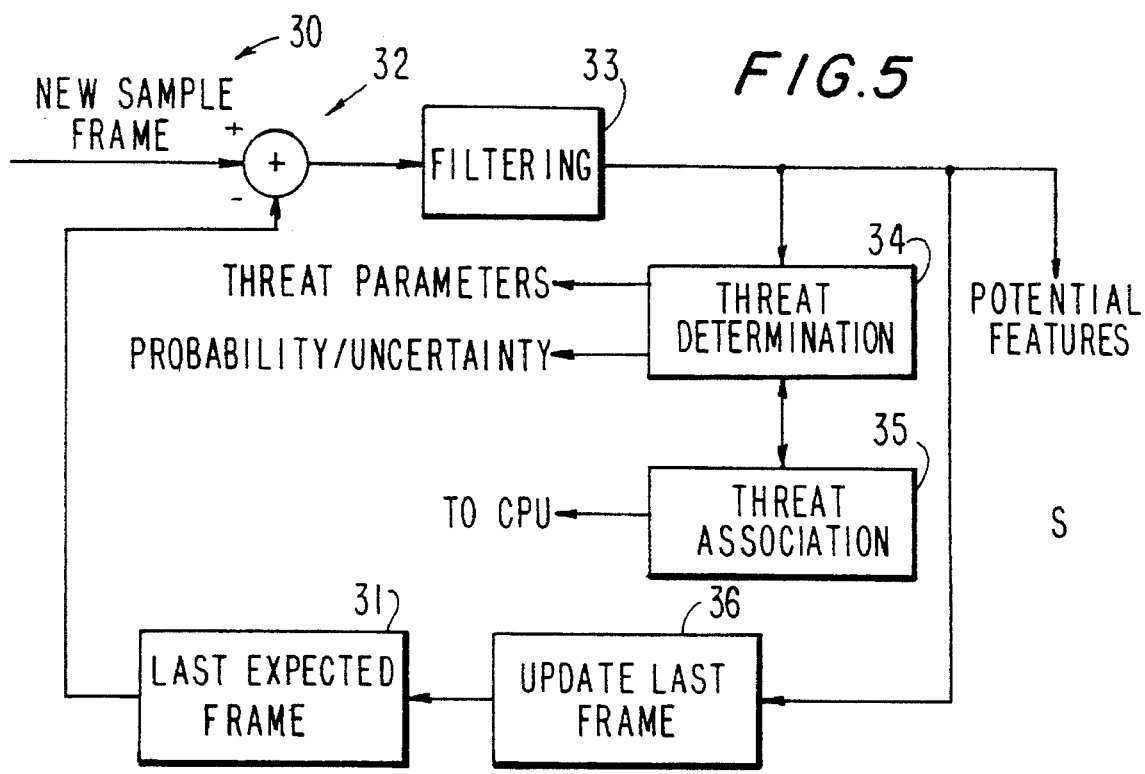
FIG. 5 is a schematic representation of a detail of FIG. 2, according to a preferred embodiment of the invention.

FIG. 5 is a schematic representation of the ISPU of FIG. 2, according to a preferred embodiment of the invention. After all the laser signals have been sampled and the frame/picture has been defined, a comparison is effected between the reference picture and the new picture 30. A subtraction of the new sampled frame from the last expected frame 31 is carried out (step 32), which results in the differences between the two frames. After a first filtering 33 is effected, to remove small differences below a predetermined threshold, the differences between the two pictures are obtained (the so-called "potential features"). From the resulting differences the computer may determine the potential threats, based on specific threat parameters, such as size, speed or distance of the potential threat, number of threats or frequency of appearance, etc. Likewise, in step 35 the threats are connected to potential threats noted in previous frames. The reference picture is routinely updated to take into account new items appearing in the area.

The signals dealt with by the system can be elaborated by known image processing techniques, e.g., such as those described in detail in "Analysis and Interpretation of Range Images", R. C. Jain and A. K. Jain, Springer-Verlag Publication, 1990, or in "theory and Application of Digital Signal Processing", R. L. Rabiner and B. Gold, Prentice-Hall, 1975.

Figure 6:
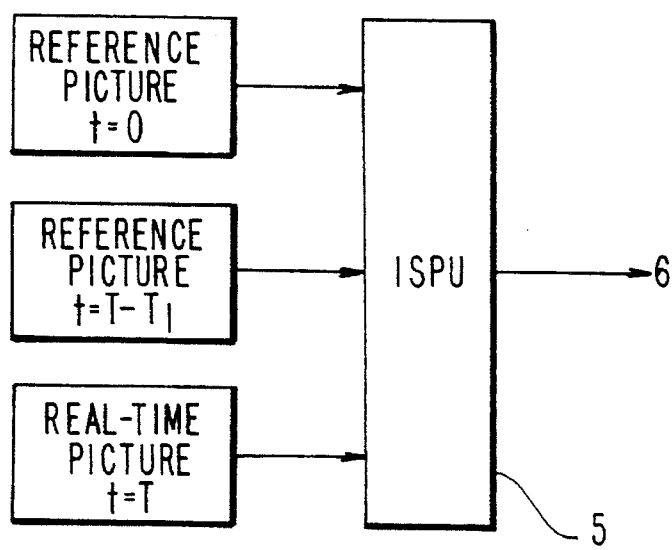
FIG. 6 schematically illustrates how the image of the scanned area is processed.

FIG. 6 schematically illustrates how the image of the scanned area is processed. The ISPU is the unit of FIG. 2. in which images are compared and a decision as to whether any substantial change has occurred between consecutive pictures is taken. If the ISPU generates an alarm signal, this signal is transmitted to appropriate alarm means, e.g., to the screen 6 of FIG. 2.

According to the preferred embodiment of FIG. 6, three consecutive pictures are compared: 1) the reference picture generated before the surveying activity of the base station begins, at t=0, which is stored in the memory of the ISPU; 2) a reference picture taken at a time $T-T_1$, typically the picture taken during the previous scanning cycle, and the real-time picture (t=T). Differences are determined by comparing the three pictures and an alarm signal is generated if the differences exceed predetermined threshold values. The means by which the pictures are compared and threshold values are selected are known in the art and, therefore, are not discussed herein in detail, for the sake of brevity.

As will be apparent to the skilled person, there are several methods of transmitting/receiving between the base station and the moving station(s). If the message is a long one, it may be impossible to transmit it in its entirety during a single scanning cycle. Thus, according to one embodiment of the invention, transmission is effected in blocks, the whole transmission being made up of a plurality of blocks received during separate scanning cycle. Receipt verification methods, to ensure completeness of transmission, are conventional and are therefore not described, for the sake of brevity.

According to another preferred embodiment of the invention, the scanning motor of the laser beam of the base station is stopped once line of sight communication is established with the moving station, for a period of time sufficient to transmit or receive the whole message. Appropriate end of message (EOM) signals can be used to resume normal scanning operation.

According to a preferred embodiment of the invention, at least the following data are transmitted between the stations:

Identification number or code of the transmitting station;
Identification number or code of the receiving station for which the message is meant;

Relative position, including range and direction;

Message;

Synchronization signals between the transmitters/receivers;

As will be apparent to the skilled person, the invention provides highly versatile means to protect a given area, while maintaining communication with friendly forces moving within it, in a point-to-point manner which is difficult to intercept. The invention thus solves many problems with which the prior art has struggled for a long time, in a simple and effective manner. Because of its simplicity and versatility, many different embodiments of the invention can be provided, and many changes can be effected. For instance, different types of modulation, image and signal processing means and apparatus, laser beam transmission and receiving devices, etc., can be employed, all without exceeding the scope of the invention. Additionally, the invention achieves considerable advantages in surveying a given area, even if no communication means are provided between the base station and the moving stations. Accordingly, the invention is intended to encompass also any such base station which does not communicate via laser beam with the moving station(s).

I claim:

1. A method of protecting a predetermined area, comprising the steps of:
   a) providing a base station positioned essentially at the center of the area to be protected, said base station being provided with a scanning laser beam generating and receiving means, image and signal processing units, a memory means, a voice receiving and transmitting means and an image viewing means;

b) causing a laser beam generated from the base station to be reflected from the surveyed area into the receiving means of the base station;

c) processing the received reflected light to generate an image of the surveyed area;

d) storing one or more scanned images in memory means, to be used as reference images;

e) at any given time, comparing a real-time scanned image with one or more stored reference image(s), to determine changes which have occurred on the image, which exceed predetermined threshold values, and alerting the operator of the base station of any such changes;

f) providing one or more moving station(s) comprising an emitting/receiving laser generating means and a signal processing means, and causing the said moving station to generate an emitted signal which identifies it;

g) providing recognition means within the signal processing means of the base station, to recognize the signal generated by the moving station as a friendly signal, and to alert the operator of the base station whether a change in the image of the scanned area belongs to a friendly or to an unfriendly force.

2. A method according to claim 1, further comprising the steps of:

h) generating a message to be transmitted in digital form and modulating the laser beam generated by the transmitting station, be it the base station or the moving station; and i) receiving in the receiving station the laser beam generated by the transmitting station and decoding the same to produce the transmitted message.

3. A method according to claim 2, wherein the transmitted message comprises the following data:

Identification number or code of the transmitting station;

Identification number or code of the receiving station for which the message is meant;

Relative position, including range and direction;

Message;

Synchronization signals between the transmitters/receivers.

4. A method according to claim 2, wherein transmission between the base station and the moving station is effected in blocks, a part of the message being transmitted during a plurality of scanning cycles of the base station.

5. A method according to claim 4, wherein the transmitted message comprises the following data:

Identification number or code of the transmitting station;

Identification number or code of the receiving station for which the message is meant;

Relative position, including range and direction;

Message;

Synchronization signals between the transmitters/receivers.

6. A method according to claim 4, wherein the message is transmitted via an intermediate mediating station;

7. A method according to claim 2, wherein the scanning movement of the laser beam of the base station is stopped once line of sight contact is achieved, and the message is transmitted in its entirety before scanning is resumed.

8. A method according to claim 7, wherein the message is transmitted via an intermediate mediating station.

Synchronization signals between the transmitters/receivers.

9. A method according to claim 7, wherein the transmitted message comprises the following data:

Identification number or code of the transmitting station;

Identification number or code of the receiving station for which the message is meant;

Relative position, including range and direction;

Message;

Synchronization signals between the transmitters/receivers.

10. A method according to claim 2, wherein the message is transmitted via an intermediate mediating station.

11. A method according to claim 10, wherein the transmitted message comprises the following data:

Identification number or code of the transmitting station;

Identification number or code of the receiving station for which the message is meant;

Relative position, including range and direction;

Message;

Synchronization signals between the transmitters/receivers.

12. A system for protecting a predetermined area, comprising:

a) a base station positioned essentially at the center of the area to be protected, said base station being provided with a scanning laser beam generating and receiving means, image and signal processing units, a memory means, a voice receiving and transmitting means and an image viewing means;

b) receiving means positioned within the base station, for receiving light from a laser beam generated from the base station and reflected from the surveyed area;

c) processing means for processing the received reflected light to generate an image of the surveyed area;

d) memory means for storing one or more scanned images, to be used as reference images;

e) comparing means for comparing, at any given time, a real-time scanned image with one or more stored reference images(s), to determine changes which have occurred on the image, which exceed predetermined threshold values, and alarm means for alerting the operator of the base station of any such changes;

f) one or more moving station(s) comprising an emitting/receiving laser generating means and a signal processing means, and a signal generating means provided within said moving station, to generate an emitted signal which identifies it;

g) recognition means provided within the signal processing means of the base station, to recognize the signal generated by the moving station as a friendly signal, and to alert the operator of the base station when a change in the image of the scanned area belongs to a friendly force.

13. A system according to claim 12, further comprising:

h) message generating means, to generate a message to be transmitted in digital form, and modulating means to modulate the laser beam generated by the transmitting station, be it the base station or the moving station; and i) receiving means provided in the receiving station, to receive the laser beam generated by the transmitting station, and decoding means to decode the same to produce the transmitted message.

14. A system for surveying a predetermined area, comprising:

a) a base station positioned essentially at the center of the area to be protected, said base station being provided with a scanning laser beam generating and receiving means, image and signal processing units and an image viewing means;

b) receiving means positioned within the base station, for receiving light from a laser beam generated from the base station and reflected from the surveyed area;

c) processing means for processing the received reflected light to generate an image of the surveyed area;

d) memory means for storing one or more scanned images, to be used as reference images; and e) comparing means for comparing, at any given time, a real-time scanned image with one or more stored reference image(s), to determine changes which have occurred on the image, which exceed predetermined threshold values, and alarm means for alerting the operator of the base station of any such changes.

* * * * *